United States Patent
Wang et al.

(10) Patent No.: US 12,030,989 B2
(45) Date of Patent: Jul. 9, 2024

(54) SUPPORTED CATALYST USED FOR SYNTHESIZING POLYETHER AMINE, PREPARATION METHOD, AND APPLICATION

(71) Applicants: Zhejiang Huangma Technology Co., Ltd., Zhejiang (CN); Zhejiang Lukean Chemical Co., Ltd., Zhejiang (CN); Zhejiang Huangma Shangyi New Material Co., Ltd., Zhejiang (CN); Shangyu Huangma Surface Activated Reagent Research Institute Co., Ltd., Zhejiang (CN)

(72) Inventors: Weisong Wang, Zhejiang (CN); Xinrong Wang, Zhejiang (CN); Yifeng Jin, Zhejiang (CN); Shengli Wang, Zhejiang (CN); Jiang Yu, Zhejiang (CN); Shicong Zhao, Zhejiang (CN); Baocheng Qiu, Zhejiang (CN)

(73) Assignees: Zhejiang Huangma Technology Co., Ltd., Shaoxing (CN); Zhejiang Lukean Chemical Co., Ltd., Shaoxing (CN); Zhejiang Huangma Shangyi New Material Co., Ltd., Shaoxing (CN); Shangyu Huangma Surface Activated Reagent Research Institute Co., Ltd., Shaoxing (CN)

( * ) Notice: Subject to any disclaimer, the term of this patent is extended or adjusted under 35 U.S.C. 154(b) by 0 days.

(21) Appl. No.: 18/071,656

(22) Filed: Nov. 30, 2022

(65) Prior Publication Data
US 2023/0174714 A1 Jun. 8, 2023

(30) Foreign Application Priority Data
Dec. 3, 2021 (CN) .......................... 202111474195.X

(51) Int. Cl.
| | |
|---|---|
| B01J 21/04 | (2006.01) |
| B01J 21/06 | (2006.01) |
| B01J 21/08 | (2006.01) |
| B01J 21/10 | (2006.01) |
| B01J 23/10 | (2006.01) |
| B01J 23/28 | (2006.01) |
| B01J 23/72 | (2006.01) |
| B01J 23/755 | (2006.01) |
| B01J 23/83 | (2006.01) |
| B01J 23/883 | (2006.01) |
| B01J 23/885 | (2006.01) |
| C08G 65/26 | (2006.01) |

(52) U.S. Cl.
CPC ............ *C08G 65/269* (2013.01); *B01J 21/04* (2013.01); *B01J 21/06* (2013.01); *B01J 21/10* (2013.01); *B01J 23/10* (2013.01); *B01J 23/885* (2013.01); *B01J 2523/17* (2013.01); *B01J 2523/22* (2013.01); *B01J 2523/31* (2013.01); *B01J 2523/3712* (2013.01); *B01J 2523/41* (2013.01); *B01J 2523/47* (2013.01); *B01J 2523/68* (2013.01)

(58) Field of Classification Search
CPC . B01J 21/04; B01J 21/063; B01J 21/08; B01J 23/10; B01J 23/28; B01J 23/72; B01J 23/755; B01J 23/83; B01J 23/883
USPC ....... 502/304, 350, 355, 415, 439, 309, 315, 502/318, 322
See application file for complete search history.

(56) References Cited

U.S. PATENT DOCUMENTS

| | | | |
|---|---|---|---|
| 3,128,311 A | 4/1964 | Shirley et al. | |
| 3,617,517 A * | 11/1971 | Rashkin ................. | C10G 35/06 502/308 |
| 4,221,768 A * | 9/1980 | Inoue ....................... | B01J 21/08 502/202 |
| 4,261,862 A * | 4/1981 | Kinoshita .............. | B01J 23/005 502/524 |
| 4,274,981 A * | 6/1981 | Suzuki ..................... | B01J 23/58 502/200 |
| 5,003,107 A | 3/1991 | Zimmerman et al. | |
| 5,972,829 A * | 10/1999 | Ichimura .............. | B01J 23/8993 123/1 R |
| 6,019,954 A * | 2/2000 | Tang ....................... | B01J 23/85 502/341 |

(Continued)

FOREIGN PATENT DOCUMENTS

| | | |
|---|---|---|
| CN | 102964586 A | 3/2013 |
| CN | 107857874 A | 3/2018 |

(Continued)

*Primary Examiner* — Cam N. Nguyen

(57) ABSTRACT

Disclosed are to a supported catalyst used for synthesizing polyether amine, and a preparation method and use thereof. The supported catalyst introduces Mo and $CeO_2$ into Ni and Cu active components. By means of the cooperation of Ni, Cu and Mo, $CeO_2$ and Ni form more active sites, such that the supported catalyst can have high reaction activity and selectivity. By using the supported catalyst to synthesize polyether amine, the amination efficiency and selectivity of polyether polyol can be greatly enhanced, thereby preparing the polyether amine with light color and narrow molecular weight distribution. In addition, the cost of the catalyst can be reduced, a process condition is relatively mild, and the disadvantage of low reaction activity of a nickel-based catalyst in synthesizing small molecule polyether amine can be overcome, such that the supported catalyst has a desirable industrial application prospect.

7 Claims, No Drawings

(56) References Cited

U.S. PATENT DOCUMENTS

| | | | | |
|---|---|---|---|---|
| 6,171,566 B1* | 1/2001 | Ku | | B01J 23/94 |
| | | | | 502/316 |
| 6,703,343 B2* | 3/2004 | Park | | B01D 53/9422 |
| | | | | 502/355 |
| 6,706,660 B2* | 3/2004 | Park | | B01J 23/06 |
| | | | | 502/247 |
| 7,179,442 B2* | 2/2007 | Hagemeyer | | B01J 23/48 |
| | | | | 423/655 |
| 8,828,339 B2* | 9/2014 | Yasutake | | C01B 3/16 |
| | | | | 423/220 |
| 8,865,609 B2* | 10/2014 | Zhou | | B01J 23/002 |
| | | | | 502/100 |
| 8,980,789 B2* | 3/2015 | Zhou | | B01J 23/847 |
| | | | | 568/885 |
| 9,024,086 B2* | 5/2015 | Zhou | | B01J 23/96 |
| | | | | 568/885 |
| 9,126,194 B2* | 9/2015 | Weiner | | C07C 29/149 |
| 9,168,511 B2* | 10/2015 | Pieterse | | B01J 37/036 |
| 9,259,712 B2* | 2/2016 | Schwab | | B01J 35/1095 |
| 9,381,500 B2* | 7/2016 | Zhou | | C07C 29/149 |
| 9,545,619 B2* | 1/2017 | Wang | | B01J 23/755 |
| 10,005,079 B2* | 6/2018 | Basin | | C01B 3/40 |
| 10,464,046 B2* | 11/2019 | Lee | | B01J 35/002 |
| 11,141,712 B2* | 10/2021 | Hong | | B01J 21/04 |
| 11,148,123 B2* | 10/2021 | Choi | | B01J 23/10 |
| 11,697,108 B2* | 7/2023 | Sheludko | | C01B 3/047 |
| | | | | 502/304 |
| 2014/0171303 A1* | 6/2014 | Yoshida | | B01J 37/0236 |
| | | | | 502/304 |
| 2014/0271390 A1* | 9/2014 | Nazarpoor | | B01J 23/894 |
| | | | | 422/177 |
| 2021/0094022 A1* | 4/2021 | Andersen | | B01J 21/04 |

FOREIGN PATENT DOCUMENTS

| | | |
|---|---|---|
| CN | 107915836 A | 4/2018 |
| CN | 108014821 A | 5/2018 |
| CN | 108017782 A | 5/2018 |
| CN | 110551278 A | 12/2019 |

* cited by examiner

SUPPORTED CATALYST USED FOR SYNTHESIZING POLYETHER AMINE, PREPARATION METHOD, AND APPLICATION

CROSS-REFERENCE TO RELATED APPLICATION

The present application claims priority from Chinese Patent Application No. 202111474195.X filed on Dec. 3, 2021, the contents of which are incorporated herein by reference in their entirety.

TECHNICAL FIELD

The present disclosure belongs to the technical field of organic polymers, and specifically, to a supported catalyst used for synthesizing polyether amine, and a preparation method and use thereof.

BACKGROUND

Polyether amine is a compound that uses a polyether structural skeleton as a main chain and uses a terminal active functional group as amino. A special molecular structure endows the polyether amine with excellent overall performance, such that the polyether amine can be widely applied to the synthesis of polyurethane and polyurea, and in particular, plays an important role in an epoxy resin curing agent. Currently, commercial polyether amine with a molecular weight ranging from 230 to 5000 is available, including monoamine, diamine, and triamine polyether amine.

Current methods for synthesizing the polyether amine are mainly classified into a leaving group method, a hydrolysis method, a nitro terminated method, a polyether nitrile alkylation method and a catalytic reduction amination method.

(1) The leaving group method: the hydroxyl at the terminal of polyether is first converted into a group that is easy to leave, such as halogen, ester and sulfonyl ester groups, so that reaction activation energy is reduced; and then reaction is performed with an amino compound. However, the main disadvantage of the synthesis method is that a large number of inorganic salts such as carboxylates and sulfonates are produced during post-treatment.

(2) The hydrolysis method: the polyether polyol is first converted into TDI prepolymer; then hydrolysis is performed under an alkaline environment to produce a carbamic acid intermediate; and finally, an amino end group is generated by means of re-decarboxylation. However, the synthesis method needs to perform a plurality of steps of reactions, and needs to strictly control the temperature, so as to inhibit the production of polyurea.

(3) The nitro terminated method: the polyether polyol is capped with a nitrobenzene compound, and then hydrogenation reduction is performed on a nitro group into the amino. However, the final product obtained by the synthesis method is not only the end amination of the polyether polyol, but also the introduction of a benzene ring.

(4) The polyether nitrile alkylation method: an addition reaction is first performed on the polyether polyol and acrylonitrile, and then hydrogenation reduction is performed on a cyano group into the amino. However, the acrylonitrile used in the synthesis method has strong toxicity.

(5) The catalytic reduction amination method: under the action of a catalyst, the polyether polyol, liquid ammonia and hydrogen are introduced, and then the polyether amine is prepared by means of one-step reaction.

It can be seen that, the above four synthesis methods need to synthesize the polyether amine by means of two or more than two processes, and the produced by-product is hard to separate. The catalytic reduction amination method is suitable for the polyether amine of industrial production. The synthesis method is mainly the catalytic reduction amination method, which is advanced in process and is in accordance with environmental requirements. In addition, the catalytic reduction amination method is to use the polyether polyol as a raw material, performs dehydrogenation under the action of the catalyst, then forms an imine intermediate by reacting with ammonia, and finally performs hydrogen reduction on the imine intermediate into the amino. Therefore, such catalyst is also known as a dehydrogenation/hydrogenation catalyst. The core difficulty of the process lies in the catalyst. The active components of the catalysts currently reported for the synthesis of the polyether amine are mainly nickel, cobalt, copper and some precious metal catalysts.

For example, the following disclosed in the prior art are catalysts required for polyether amine and preparation methods thereof.

CN110551278A discloses a supported catalyst. Supported active metal is palladium, and the content of the palladium is 0.4%-0.6%. The supported catalyst shows good catalytic activity and selectivity for the amination reaction of polyether polyol with a molecular weight ranging from 200 to 2000. However, the service life of the supported catalyst is unknown when the supported catalyst is applied to a precious metal catalyst.

CN108014821A discloses a catalyst used for synthesizing polyether amine. The carrier of the catalyst is $NbAlO_4$, the content of an active component NiO is 1-15 wt %, the content of $Au_2O_3$ is 0.01-2 wt %, and the content of $SeO_2$ is 0.01-1 wt %. The special feature is the use of metal catalysts in an oxidation state, but precious metal gold and selenium oxide with strong toxicity are used.

The above catalysts use precious metals such as palladium, rhodium, gold and the like, such that costs are increased. Therefore, the catalysts are not suitable for industrial application.

CN107857874A discloses a method for preparing polyether amine with a molecular weight ranging from 200 to 8000. A catalyst used includes 1-5% of Al, 90-95% of Ni and 1-3% of Sn, or 10-15% of Al, 80-90% of Ni, 3-6% of Fe and 1-3% of Cr; and an inorganic base is used as a cocatalyst. However, the long-term use of the inorganic base may lead to passivation of some alkali metals and reduction of catalytic activity.

CN108017782A discloses a method for preparing polyether amine. The carrier used in the method is a magnesium-aluminum composite oxide; and a metal component includes 80-95% of Ni, 4.5-15% of Cu and 0.5-5% of La. A catalyst is suitable for preparing the polyether amine with a molecular weight being more than 800, but does not involve the application of small molecular weight polyether amine.

U.S. Pat. No. 3,128,311 discloses a method for preparing polyether amine and a catalyst. The catalyst used is a Ni—Cu—Cr co-precipitation metal catalyst. However, a reaction process requires a high temperature and pressure.

U.S. Pat. No. 5,003,107 discloses a Ni—Cu—Mo catalyst. The content of Ni is 70-75%, the content of Cu is 20-25%, and the content of Mo is 1-5%. The catalyst is suitable for the amination of polytetrahydrofuran polyether with a molecular weight ranging from 1000 to 2000.

CN107915836A discloses a nickel skeleton catalyst used to prepare polyether amine. However, the magnesium-aluminum composite oxide is used as the carrier, and a reaction condition is relatively mild.

The above catalysts use relatively inexpensive metals as active components and cocatalysts, but most of the catalysts are not suitable for the amination of small molecular weight polyether polyol. Currently, the process condition of the catalytic reduction amination method for preparing polyether amine in one step is very rigorous, high temperature and high pressure are required, and the costs of the used catalysts are relatively high. Existing processes for the preparation of polyether amine often lead to fracture of a polyether chain, resulting in broadened molecular weight distribution and reduced reaction selectivity, thereby affecting the performance of the processes in downstream applications. Therefore, exploring an efficient and mild catalyst is a pressing technical challenge in the field.

SUMMARY

In order to overcome the deficiencies in the prior art, the present disclosure is intended to provide a supported catalyst used for synthesizing polyether amine, a preparation method, and use thereof. The supported catalyst has high reactivity and selectivity, and can greatly enhance the amination efficiency and selectivity of polyether polyol. In addition, by using the supported catalyst in the present disclosure to synthesize polyether polyol, the cost of the catalyst can be reduced, a process condition is relatively mild, the disadvantage of low reaction activity of a nickel-based catalyst in synthesizing small molecule polyether amine can be overcome, the color of the prepared polyether amine is light, and molecular weight distribution is narrow.

In order to solve the above problems, the present disclosure provides the following technical solutions.

The present disclosure provides a supported catalyst used for synthesizing polyether amine. The supported catalyst includes a carrier, active components, and a cocatalyst, wherein the active components are Ni, Cu and Mo;
the cocatalyst is $CeO_2$, and
based on the total weight of the supported catalyst, the content of Ni is 2%-15%, the content of Cu is 1%-5%, the content of Mo is 0.1%-0.6%, the content of Ce in $CeO_2$ is 1%-8%, and the total supported amount of the active components is not less than 10%.

Preferably, the content of Ni is 4%-12%, preferably 5%-10%; the content of Cu is 1.5%-4%; the content of Mo is 0.2%-0.5%; the content of Ce in $CeO_2$ is 3%-6%; and the total supported amount of the active components is not less than 12%. In the solution, while the conversion rate and selectivity of the polyether amine are enhanced, the supported amount of metal is further reduced; and no precious metal is used, and the supported amount of secondary precious metal molybdenum is reduced, such that lower costs are achieved.

More preferably, the content of Ni is 5%-10%; the content of Cu is 2%-3.5%; the content of Mo is 0.3%-0.4%; the content of Ce in $CeO_2$ is 4%-5%; and the total supported amount of the active components is not less than 15%. In the solution, while the conversion rate and selectivity of the polyether amine are enhanced, the supported amount of the metal is further reduced; and the supported amount of the secondary precious metal molybdenum is reduced, such that lower costs are achieved.

According to the supported catalyst in the present disclosure, the reactivity of Ni is greatly enhanced by the synergistic effect of Ni, Cu and Mo. When the catalyst is separately supported with Ni, Cu and Mo, the conversion rate of the catalyst used for preparing a polyether amine product is about 50%; after $CeO_2$ is introduced, the conversion rate of the catalyst used for preparing a polyether amine product is more than 95%; and by adding Ni and $CeO_2$, the conversion rate of the catalyst used for preparing a polyether amine product is also more than 90%. It is speculated that the active site is N—Ce—O, which facilitates the formation of metal nitride. Therefore, the supported catalyst in the present disclosure can greatly enhance the amination efficiency and selectivity of polyether polyol, and the polyether amine with light color and narrow molecular weight distribution can be prepared.

Further, a mass ratio of the Ce in $CeO_2$ to Ni is 0.3-0.8:1. If the mass ratio is within the range, the mass ratio of Ce is increased from 0.3 to 0.8, such that the catalytic effect of the supported catalyst is gradually improved; if the mass ratio is lower than the ratio range, the catalytic effect cannot meet the requirement for enhancing the conversion rate and selectivity of the polyether amine; if the mass ratio is higher than the ratio range, there is no significant change in the conversion rate and selectivity of the polyether amine, resulting in unnecessary waste and increased cost.

Further, the carrier is γ-alumina, amorphous silica, titanium dioxide and magnesium-aluminum composite oxide.

Further, the magnesium-aluminum composite oxide is prepared by a potassium hydroxide solution and a nitrate solution by means of a co-precipitation method. During preparation, the potassium hydroxide solution is slowly added to the nitrate solution, so as to obtain a white pasty sediment. After reflux is performed for a period of time, a crystallized sediment is obtained. Then filtering and washing are performed, so as to prepare the precursor of a magnesium-aluminum composite oxide carrier; the precursor of the magnesium-aluminum composite oxide carrier is then put into a muffle furnace for roasting, so as to obtain the magnesium-aluminum composite oxide. The potassium hydroxide solution is prepared by dissolving potassium hydroxide into deionized water, and the nitrate solution is prepared by dissolving magnesium nitrate and aluminum nitrate into the deionized water.

Further, the specific surface area of the magnesium-aluminum composite oxide is 150-230 $m^2$/g, the pore diameter is 8-18 nm, the pore volume is 0.2-0.6 mL/g, and the bulk density is 0.6-0.8 g/mL. By means of using the magnesium-aluminum composite oxide with the above features as the carrier, the catalytic activity of the supported catalyst can be further improved.

The present disclosure further provides a method for preparing the supported catalyst used for synthesizing polyether amine. The preparation method uses an equivalent-volumetic impregnation method to cause a carrier to adsorb active components, and then prepares the supported catalyst by means of roasting and reduction. The method specifically includes the following steps.

S1. An active metal salt is added to deionized water, so as to obtain a metal salt solution. The step specifically includes: dissolving the active metal salt into the deionized water according to a fixed quantity; and rising a temperature, and performing stirring, so as to obtain the metal salt solution.

During temperature rising and stirring, the temperature is risen to 60° C., and the stirring time is 0.5 h.

S2. The equivalent-volumetic impregnation method is used to add the carrier to the metal salt solution for immersion. This step specifically includes: adding the carrier to the metal salt solution; pouring the solution into a rotary evaporator; and then successively performing temperature rising, rotation and standing.

S3. After immersion, distillation dehydration under vacuum and roasting are successively performed. This step specifically includes: after immersion and full adsorption, performing temperature rising and vacuum distillation dehydration; then taking the immersed carrier out, and putting the carrier into a muffle furnace; gradually rising the temperature; performing roasting under an air atmosphere; and then, performing cooling.

S4. Reduction is performed under a hydrogen atmosphere, so as to obtain the supported catalyst. This step specifically includes: putting the roasted carrier into a tube furnace; gradually rising the temperature in a hydrogen stream; and performing reduction, so as to obtain the supported catalyst.

Further, the active metal salt in S1 is nickel nitrate hexahydrate, copper nitrate hexahydrate, ammonium molybdate tetrahydrate and cerium nitrate hexahydrate.

Further, an immersion temperature in S2 is 45° C., and immersion time is 0.5-1 h; a temperature for distillation dehydration in S3 is 80° C.-100° C., and the time for distillation dehydration is 1-2 h; a roasting temperature is 350° C.-450° C., and roasting time is 4-6 h; and a reduction temperature in S4 is 400° C.-500° C., and reduction time is 8-12 h.

The present disclosure further provides use of the supported catalyst in synthesis of polyether amine. During application, polyether polyol, liquid ammonia and hydrogen are introduced into a reactor holding the supported catalyst for an amination reaction, so as to prepare the polyether amine. By means of the supported catalyst in the present disclosure, the conversion rate of the polyether polyol may reach more than 95%, primary amine selectivity may reach more than 98%, and the color of the obtained polyether amine by using a Pt—Co method is below 15.

Further, the molecular weight of the polyether polyol for the amination reaction to which the catalyst is applicable is 100-3000, preferably 148-2000, and more preferably 200-600. A skeleton structure of the polyether polyol contains ethylene oxide and one or two of ethylene oxide. The polyether polyol contains more than one hydroxyl groups.

Further, the reactor is an intermittent high-pressure reactor or a continuous fixed bed reactor, preferably the continuous fixed bed reactor.

Further, the temperature of the amination reaction is controlled between 140° C. and 250° C., and the pressure of the amination reaction is controlled between 8 Mpa and 20 Mpa.

Further, the feeding space speed of the polyether polyol is controlled between 0.01 and 2.0 $h^{-1}$; the mole ratio of the liquid ammonia to the polyether polyol is controlled between (10-20):1; and the mole ratio of the hydrogen to the polyether polyol is controlled between (0.5-5):1.

Compared with the prior art, the present disclosure has the following beneficial effects.

(1) The active components Ni, Cu and Mo are introduced into a polyether amination catalyst; the catalytic dehydrogenation/hydrogenation capacities of the Ni and Cu are enhanced by means of the synergistic effect of Mo, Ni and Cu, such that the conversion rate and selectivity of the polyether amine can be greatly improved.

(2) By means of introducing $CeO_2$ to increase the adsorption sites of the polyether polyol, and inhibiting the formation of the metal nitride to a certain extent, the catalytic activity and service life of active metals can be increased.

(3) According to the supported catalyst of the present disclosure, a precious metal catalyst can be prevented from being used, and the supported amount of the secondary precious metal molybdenum is also relatively small; and the supported catalyst is good in dispersibility and low in cost.

(4) The supported catalyst of the present disclosure is wide in application range of reaction substrates. Therefore, the supported catalyst is suitable for the synthesis of high molecular weight polyether amine, and in particular, for the synthesis of the polyether amine with the molecular weight being less than 600.

DETAILED DESCRIPTION OF THE EMBODIMENTS

To make the objectives, technical solutions and advantages of the present disclosure clearer, the invention is further described in detail with reference to the embodiments. It should be understood that the specific examples described here are merely used to explain the invention, and are not used to limit the invention.

Experimental methods for which specific conditions are not indicated in the following examples are selected according to conventional methods and conditions.

In the following embodiments, for a method for measuring a hydroxyl value, refer to GB/T 12008.3-2009, and a molecular weight is calculated.

The method for measuring a total amine value uses a 0.5 mol/L hydrochloric acid solution to titrate a product. The total amine value of the product can be calculated by means of the volume of hydrochloric acid consumed.

Amination conversion rate=total amine value of product/hydroxyl value of raw material×1000%.

The method for measuring a secondary/tertiary amine value includes: mixing and stirring the product and salicylaldehyde of the same mass for 2 h, and then using a 0.5 mol/L hydrochloric acid solution to titrate the product. The sum of the secondary amine and tertiary amine values of the product can be calculated by means of the volume of hydrochloric acid consumed.

Primary amine selectivity=(Total amine value/tertiary amine value)/Total amine value×100%.

For a method for measuring color, refer to a GB/T 3143 platinum cobalt (Pt—Co/Hazen/APHA color standard) method for colorimetric determination.

In the embodiments, a reduction amination reactor is a fixed bed reactor.

In the following embodiments, where not explicitly stated, the chemicals used are analytically pure, and the contents involved are by mass.

In the following embodiments, the 7-$Al_2O_3$ carrier is purchased from Luhao Filter Material (Gongyi) Co., Ltd; and the amorphous silica carrier is purchased from Shanghai BKL Development Co., Ltd.

In the following embodiments, the supported amount is a metal supported amount, where Ce is present in the form of $CeO_2$.

Example 1

49.3 g of nickel nitrate hexahydrate, 11.7 g of copper nitrate hexahydrate, 5.2 g of ammonium molybdate tetrahydrate and 15.5 g of cerium nitrate hexahydrate are dissolved in 82 mL of deionized water, are heated to 60° C. and stirred for 0.5 h, so as to obtain a metal salt solution; then the metal salt solution and 82.1 g of spherical γ-alumina are poured into a rotary evaporator, a temperature is risen to 45° C., then rotation is performed for 0.5 h, and standing is performed for 0.5 h after rotation stops; next, after full adsorption, the temperature is risen to 90° C., then vacuum dehydration is performed for 1 h, then an immersed carrier is taken out and put into a muffle furnace, the temperature is gradually risen to 420° C., roasting is performed for 5 h under an air atmosphere, and cooling is performed; and finally, the roasted carrier is taken out and put into a tube furnace, the temperature is gradually risen to 450° C. in a 0.1 mL/min hydrogen stream, and after reduction is performed for 8 h, a supported catalyst A containing 10 wt % of Ni, 2.5 wt % of Cu, 0.4 wt % of Mo and 5 wt % of Ce.

Example 2

49.3 g of nickel nitrate hexahydrate, 11.7 g of copper nitrate hexahydrate, 5.2 g of ammonium molybdate tetrahydrate and 15.5 g of cerium nitrate hexahydrate are dissolved in 82 mL of deionized water, are heated to 60° C. and stirred for 0.5 h, so as to obtain a metal salt solution; then the metal salt solution and 82.1 g of amorphous silica are poured into a rotary evaporator, a temperature is risen to 45° C., then rotation is performed for 0.5 h, and standing is performed for 0.5 h after rotation stops; next, after full adsorption, the temperature is risen to 90° C., then vacuum dehydration is performed for 1 h, then an immersed carrier is taken out and put into a muffle furnace, the temperature is gradually risen to 420° C., roasting is performed for 5 h under an air atmosphere, and cooling is performed; and finally, the roasted carrier is taken out and put into a tube furnace, the temperature is gradually risen to 450° C. in a 0.1 m/min hydrogen stream, and after reduction is performed for 8 h, a supported catalyst B containing 10 wt % of Ni, 2.5 wt % of Cu, 0.4 wt % of Mo and 5 wt % of Ce.

Example 3

Potassium hydroxide is dissolved in the deionized water, so as to obtain a potassium hydroxide solution; meanwhile, 440 g of magnesium nitrate and 200 g of aluminum nitrate are dissolved in the deionized water, and the solution is heated for a period of time at 50° C.; then in the state of stirring and heating, 6 mol/L of the potassium hydroxide solution is slowly dripped into a nitrate solution, so as to obtain a white pasty sediment; next, after reflux is performed for 1 h at 80° C., a crystallized sediment is obtained, then filtering and washing are performed, so as to prepare the precursor of a magnesium-aluminum composite oxide carrier; and finally, the precursor is put into the muffle furnace, and the magnesium-aluminum composite oxide carrier is obtained by performing roasting for 5 h at 700° C.

49.3 g of nickel nitrate hexahydrate, 11.7 g of copper nitrate hexahydrate, 5.2 g of ammonium molybdate tetrahydrate and 15.5 g of cerium nitrate hexahydrate are dissolved in 82 mL of deionized water, are heated to 60° C. and stirred for 0.5 h, so as to obtain a metal salt solution; then the metal salt solution and 82.1 g of the prepared magnesium-aluminum composite oxide are poured into a rotary evaporator, a temperature is risen to 45° C., then rotation is performed for 0.5 h, and standing is performed for 0.5 h after rotation stops; next, after full adsorption, the temperature is risen to 90° C., then vacuum dehydration is performed for 1 h, then an immersed carrier is taken out and put into a muffle furnace, the temperature is gradually risen to 420° C., roasting is performed for 5 h under an air atmosphere, and cooling is performed; and finally, the roasted carrier is taken out and put into a tube furnace, the temperature is gradually risen to 450° C. in a 0.1 mL/min hydrogen stream, and after reduction is performed for 8 h, a supported catalyst C containing 10 wt % of Ni, 2.5 wt % of Cu, 0.4 wt % of Mo and 5 wt % of Ce.

Example 4

74 g of nickel nitrate hexahydrate, 18.6 g of copper nitrate hexahydrate, 3.9 g of ammonium molybdate tetrahydrate and 21.7 g of cerium nitrate hexahydrate are dissolved in 74 mL of deionized water, are heated to 60° C. and stirred for 0.5 h, so as to obtain a metal salt solution; then the metal salt solution and 73.7 g of the magnesium-aluminum composite oxide prepared according to the method in Embodiment 3 are poured into a rotary evaporator, a temperature is risen to 45° C., then rotation is performed for 0.5 h, and standing is performed for 0.5 h after rotation stops; next, after full adsorption, the temperature is risen to 90° C., then vacuum dehydration is performed for 1 h, then an immersed carrier is taken out and put into a muffle furnace, the temperature is gradually risen to 420° C., roasting is performed for 5 h under an air atmosphere, and cooling is performed; and finally, the roasted carrier is taken out and put into a tube furnace, the temperature is gradually risen to 450° C. in a 0.1 mL/min hydrogen stream, and after reduction is performed for 7 h, a supported catalyst D containing 15 wt % of Ni, 4 wt % of Cu, 0.3 wt % of Mo and 7 wt % of Ce.

Example 5

49.3 g of nickel nitrate hexahydrate, 11.7 g of copper nitrate hexahydrate, 7.7 g of ammonium molybdate tetrahydrate and 24.8 g of cerium nitrate hexahydrate are dissolved in 79 mL of deionized water, are heated to 60° C. and stirred for 0.5 h, so as to obtain a metal salt solution; then the metal salt solution and 78.9 g of the magnesium-aluminum composite oxide prepared according to the method in Embodiment 3 are poured into a rotary evaporator, a temperature is risen to 45° C., then rotation is performed for 0.5 h, and standing is performed for 0.5 h after rotation stops; next, after full adsorption, the temperature is risen to 90° C., then vacuum dehydration is performed for 1 h, then an immersed carrier is taken out and put into a muffle furnace, the temperature is gradually risen to 420° C., roasting is performed for 5 h under an air atmosphere, and cooling is performed; and finally, the roasted carrier is taken out and put into a tube furnace, the temperature is gradually risen to 450° C. in a 0.1 mL/min hydrogen stream, and after reduction is performed for 10 h, a supported catalyst E containing 10 wt % of Ni, 2.5 wt % of Cu, 0.6 wt % of Mo and 8 wt % of Ce.

Example 6

59.2 g of nickel nitrate hexahydrate, 18.6 g of copper nitrate hexahydrate, 5.2 g of ammonium molybdate tetrahydrate and 15.5 g of cerium nitrate hexahydrate are dissolved in 79 mL of deionized water, are heated to 60° C. and stirred for 0.5 h, so as to obtain a metal salt solution; then the metal salt solution and 78.6 g of the magnesium-aluminum composite oxide prepared according to the method in Embodiment 3 are poured into a rotary evaporator, a temperature is risen to 45° C., then rotation is performed for 0.5 h, and standing is performed for 0.5 h after rotation stops; next, after full adsorption, the temperature is risen to 90° C., then vacuum dehydration is performed for 1 h, then an immersed carrier is taken out and put into a muffle furnace, the temperature is gradually risen to 420° C., roasting is performed for 5 h under an air atmosphere, and cooling is performed; and finally, the roasted carrier is taken out and put into a tube furnace, the temperature is gradually risen to 450° C. in a 0.1 mL/min hydrogen stream, and after reduction is performed for 8 h, a supported catalyst F containing 12 wt % of Ni, 4 wt % of Cu, 0.4 wt % of Mo and 5 wt % of Ce.

Example 7

54.3 g of nickel nitrate hexahydrate, 14 g of copper nitrate hexahydrate, 5.2 g of ammonium molybdate tetrahydrate and 18.6 g of cerium nitrate hexahydrate are dissolved in 80 mL of deionized water, are heated to 60° C. and stirred for 0.5 h, so as to obtain a metal salt solution; then the metal salt solution and 79.6 g of the magnesium-aluminum composite oxide prepared according to the method in Embodiment 3 are poured into a rotary evaporator, a temperature is risen to 45° C., then rotation is performed for 0.5 h, and standing is performed for 0.5 h after rotation stops; next, after full adsorption, the temperature is risen to 90° C., then vacuum dehydration is performed for 1 h, then an immersed carrier is taken out and put into a muffle furnace, the temperature is gradually risen to 420° C., roasting is performed for 5 h under an air atmosphere, and cooling is performed; and finally, the roasted carrier is taken out and put into a tube furnace, the temperature is gradually risen to 450° C. in a 0.1 mL/min hydrogen stream, and after reduction is performed for 8 h, a supported catalyst G containing 11 wt % of Ni, 3 wt % of Cu, 0.4 wt % of Mo and 6 wt % of Ce.

Comparative Example 1

Comparative example 1 is basically the same as Embodiment 3, and the difference lies in that, the metal salt solution of Comparative example 1 does not contain the ammonium molybdate tetrahydrate and the cerium nitrate hexahydrate, and the obtained catalyst is C-1.

Comparative Example 2

Comparative example 2 is basically the same as Embodiment 3, and the difference lies in that, the metal salt solution of Comparative example 2 does not contain the ammonium molybdate tetrahydrate, and the obtained catalyst is C-2.

Comparative Example 3

Comparative example 3 is basically the same as Embodiment 3, and the difference lies in that, the metal salt solution of Comparative example 3 does not contain the cerium nitrate hexahydrate, and the obtained catalyst is C-3.

Example 8

Preparation of Polyether Amine EDR-148 (Molecular Weight 148, Bifunctional Group Degree)
80 mL of the supported catalyst A prepared in Embodiment 1 is first filled in a fixed bed continuous flow reactor, part of liquid ammonia is pumped, the reactor is heated to 200° C., and then hydrogen is re-pumped so as to increase the pressure of the reactor to 15 Mpa; then after a reaction system is stabilized, the space speed of polyether polyol is 0.3 h$^{-1}$, a mole ratio of the liquid ammonia to the polyether polyol is 18:1, and a mole ratio of the hydrogen to the polyether polyol is 0.8:1; and next, a continuous stable reaction is performed for 24 h, then discharging is performed, filtering, vacuum rotary evaporation dehydration and deamination are performed on a crude product, so as to obtain the polyether amine EDR-148.

A detection result of the polyether amine EDR-148 shows that the color measured by a Pt—Co method is 12; by means of measuring a total amine value, the conversion rate for generating the corresponding polyether amine may be calculated to be 96%; by means of measuring a secondary/tertiary amine value, the primary amine selectivity of the polyether amine may be calculated to be 98%, based on the total amine content.

Example 9

Preparation of Polyether Amine D-230 (Molecular Weight 230, Bifunctional Group Degree)
80 mL of the supported catalyst C prepared in Embodiment 3 is first filled in a fixed bed continuous flow reactor, part of liquid ammonia is pumped, the reactor is heated to 180° C., and then hydrogen is re-pumped so as to increase the pressure of the reactor to 13.5 Mpa; then after a reaction system is stabilized, the space speed of polyether polyol is 0.5 h$^{-1}$, a mole ratio of the liquid ammonia to the polyether polyol is 14:1, and a mole ratio of the hydrogen to the polyether polyol is 1:1; and next, a continuous stable reaction is performed for 24 h, then discharging is performed, filtering, vacuum rotary evaporation dehydration and deamination are performed on a crude product, so as to obtain the polyether amine D-230.

A detection result of the polyether amine D-230 shows that the color measured by a Pt—Co method is 8; by means of measuring a total amine value, the conversion rate for generating the corresponding polyether amine may be calculated to be 99%; by means of measuring a secondary/tertiary amine value, the primary amine selectivity of the polyether amine may be calculated to be 98%, based on the total amine content.

Example 10

Preparation of Polyether Amine T-403 (Molecular Weight 403, Trifunctional Group Degree)
80 mL of the supported catalyst D prepared in Embodiment 4 is first filled in a fixed bed continuous flow reactor, part of liquid ammonia is pumped, the reactor is heated to 210° C., and then hydrogen is re-pumped so as to increase the pressure of the reactor to 15 Mpa; then after a reaction system is stabilized, the space speed of polyether polyol is 0.2 h$^{-1}$, a mole ratio of the liquid ammonia to the polyether polyol is 20:1, and a mole ratio of the hydrogen to the polyether polyol is 1:1; and next, a continuous stable reaction is performed for 24 h, then discharging is performed, filtering, vacuum rotary evaporation dehydration and deamination are performed on a crude product, so as to obtain the polyether amine T-403.

A detection result of the polyether amine T-403 shows that the color measured by a Pt—Co method is 15; by means of measuring a total amine value, the conversion rate for generating the corresponding polyether amine may be calculated to be 97%; by means of measuring a secondary/ tertiary amine value, the primary amine selectivity of the polyether amine may be calculated to be 98%, based on the total amine content.

Example 11

Preparation of Polyether Amine M-600 (Molecular Weight 600, Monofunctional Group Degree)

80 mL of the supported catalyst B prepared in Embodiment 2 is first filled in a fixed bed continuous flow reactor, part of liquid ammonia is pumped, the reactor is heated to 170° C., and then hydrogen is re-pumped so as to increase the pressure of the reactor to 12.5 Mpa; then after a reaction system is stabilized, the space speed of polyether polyol is 0.8 $h^{-1}$, a mole ratio of the liquid ammonia to the polyether polyol is 12:1, and a mole ratio of the hydrogen to the polyether polyol is 2:1; and next, a continuous stable reaction is performed for 24 h, then discharging is performed, filtering, vacuum rotary evaporation dehydration and deamination are performed on a crude product, so as to obtain the polyether amine M-600.

A detection result of the polyether amine M-600 shows that the color measured by a Pt—Co method is 9; by means of measuring a total amine value, the conversion rate for generating the corresponding polyether amine may be calculated to be 98%; by means of measuring a secondary/tertiary amine value, the primary amine selectivity of the polyether amine may be calculated to be 99%, based on the total amine content.

Example 12

Preparation of Polyether Amine D-2000 (Molecular Weight 2000, Bifunctional Group Degree)

80 mL of the supported catalyst E prepared in Embodiment 5 is first filled in a fixed bed continuous flow reactor, part of liquid ammonia is pumped, the reactor is heated to 170° C., and then hydrogen is re-pumped so as to increase the pressure of the reactor to 12.5 Mpa; then after a reaction system is stabilized, the space speed of polyether polyol is 0.8 $h^{-1}$, a mole ratio of the liquid ammonia to the polyether polyol is 12:1, and a mole ratio of the hydrogen to the polyether polyol is 2:1; and next, a continuous stable reaction is performed for 24 h, then discharging is performed, filtering, vacuum rotary evaporation dehydration and deamination are performed on a crude product, so as to obtain the polyether amine D-2000.

A detection result of the polyether amine D-2000 shows that the color measured by a Pt—Co method is 9; by means of measuring a total amine value, the conversion rate for generating the corresponding polyether amine may be calculated to be 98%; by means of measuring a secondary/tertiary amine value, the primary amine selectivity of the polyether amine may be calculated to be 99%, based on the total amine content.

Example 13

Preparation of Polyether Amine M-2070 (Molecular Weight 2070, Monofunctional Group Degree)

80 mL of the supported catalyst F prepared in Embodiment 6 is first filled in a fixed bed continuous flow reactor, part of liquid ammonia is pumped, the reactor is heated to 170° C., and then hydrogen is re-pumped so as to increase the pressure of the reactor to 12 Mpa; then after a reaction system is stabilized, the space speed of polyether polyol is 1.0 $h^{-1}$, a mole ratio of the liquid ammonia to the polyether polyol is 10:1, and a mole ratio of the hydrogen to the polyether polyol is 1:1; and next, a continuous stable reaction is performed for 24 h, then discharging is performed, filtering, vacuum rotary evaporation dehydration and deamination are performed on a crude product, so as to obtain the polyether amine M-2070.

A detection result of the polyether amine M-2070 shows that the color measured by a Pt—Co method is 13; by means of measuring a total amine value, the conversion rate for generating the corresponding polyether amine may be calculated to be 97%; by means of measuring a secondary/tertiary amine value, the primary amine selectivity of the polyether amine may be calculated to be 98%, based on the total amine content.

Example 14

Preparation of Polyether Amine T-3000 (Molecular Weight 3000, Trifunctional Group Degree)

80 mL of the supported catalyst G prepared in Embodiment 7 is first filled in a fixed bed continuous flow reactor, part of liquid ammonia is pumped, the reactor is heated to 200° C., and then hydrogen is re-pumped so as to increase the pressure of the reactor to 15 Mpa; then after a reaction system is stabilized, the space speed of polyether polyol is 0.6 $h^{-1}$, a mole ratio of the liquid ammonia to the polyether polyol is 12:1, and a mole ratio of the hydrogen to the polyether polyol is 1.5:1; and next, a continuous stable reaction is performed for 24 h, then discharging is performed, filtering, vacuum rotary evaporation dehydration and deamination are performed on a crude product, so as to obtain the polyether amine T-3000.

A detection result of the polyether amine T-3000 shows that the color measured by a Pt—Co method is 15; by means of measuring a total amine value, the conversion rate for generating the corresponding polyether amine may be calculated to be 95%; and by means of measuring a secondary/tertiary amine value, the primary amine selectivity of the polyether amine may be calculated to be 98%, based on the total amine content.

Comparative Example 4

Comparative example 4 is basically the same as Embodiment 9, and the difference lies in that, the supported catalyst C is replaced with the catalyst C-1 prepared in Comparative example 1 for reaction, so as to obtain the polyether amine. A detection result of the polyether amine shows that the color measured by a Pt—Co method is 20; by means of measuring a total amine value, the conversion rate for generating the corresponding polyether amine may be calculated to be 56%; by means of measuring a secondary/tertiary amine value, the primary amine selectivity of the polyether amine may be calculated to be 93%, based on the total amine content.

Comparative Example 5

Comparative example 5 is basically the same as Embodiment 9, and the difference lies in that, the supported catalyst C is replaced with the catalyst C-2 prepared in Comparative example 2 for reaction, so as to obtain the polyether amine. A detection result of the polyether amine shows that the color measured by a Pt—Co method is 10; by means of measuring a total amine value, the conversion rate for generating the corresponding polyether amine may be calculated to be 77%; by means of measuring a secondary/ tertiary amine value, the primary amine selectivity of the polyether amine may be calculated to be 98%, based on the total amine content.

Comparative Example 6

Comparative example 6 is basically the same as Embodiment 9, and the difference lies in that, the supported catalyst C is replaced with the catalyst C-3 prepared in Comparative example 3 for reaction, so as to obtain the polyether amine. A detection result of the polyether amine shows that the color measured by a Pt—Co method is 18; by means of measuring a total amine value, the conversion rate for generating the corresponding polyether amine may be calculated to be 85%; by means of measuring a secondary/tertiary amine value, the primary amine selectivity of the polyether amine may be calculated to be 95%, based on the total amine content.

Comparative Example 7

The catalyst is prepared by using the method in Embodiment 1 of the Patent CN102964586A, and using NaOH to react with Ni—Al—Mo alloy; then by means of adjusting a PH value, the catalyst containing 50% of Ni, 48% of Al and 2% of Mo is prepared; and the preparation of the polyether amine D-230 in Embodiment 9 of this application is used for evaluation. Results show that the color measured by a Pt—Co method is 12; by means of measuring a total amine value, the conversion rate for generating the corresponding polyether amine D-230 may be calculated to be 93%; by means of measuring a secondary/tertiary amine value, the primary amine selectivity of the polyether amine may be calculated to be 94%, based on the total amine content.

The above embodiments are only preferred embodiments of the present disclosure and cannot be used to limit the scope of protection of the present disclosure. Any non-substantial changes and substitutions made by a person skilled in the art on the basis of the present disclosure fall within the scope of protection claimed by the present disclosure.

What is claimed is:

1. A supported catalyst used for synthesizing polyether amine, comprising:
   a carrier;
   active components, which are Ni, Cu and Mo; and
   a cocatalyst, which is $CeO_2$, wherein
   based on the total weight of the supported catalyst, the content of Ni is 2%-15%, the content of Cu is 1%-5%, the content of Mo is 0.1%-0.6%, the content of Ce in $CeO_2$ is 1%-8%, and the total supported amount of the active components is not less than 10%; and
   wherein the carrier is γ-alumina, amorphous silica, titanium dioxide, or magnesium-aluminum composite oxide.

2. The supported catalyst as claimed in claim 1, wherein based on the total weight of the supported catalyst, the content of Ni is 4%-12%; the content of Cu is 1.5%-4%; the content of Mo is 0.2%-0.5%; the content of Ce in $CeO_2$ is 3%-6%; and the total supported amount of the active components is not less than 12%.

3. The supported catalyst as claimed in claim 2, wherein a mass ratio of the Ce in $CeO_2$ to Ni is 0.3-0.8:1.

4. The supported catalyst as claimed in claim 1, wherein a mass ratio of the Ce in $CeO_2$ to Ni is 0.3-0.8:1.

5. The supported catalyst as claimed in claim 1, wherein the magnesium-aluminum composite oxide is prepared from a potassium hydroxide solution and a nitrate solution by means of a co-precipitation method; during preparation, the potassium hydroxide solution is slowly added to the nitrate solution, so as to obtain a white pasty sediment; after reflux is performed for a period of time, a crystallized sediment is obtained; then filtering and washing are performed, so as to prepare a precursor of a magnesium-aluminum composite oxide carrier; the precursor of the magnesium-aluminum composite oxide carrier is then put into a muffle furnace for roasting, so as to obtain the magnesium-aluminum composite oxide; and
   the potassium hydroxide solution is prepared by dissolving potassium hydroxide into deionized water, and the nitrate solution is prepared by dissolving magnesium nitrate and aluminum nitrate into deionized water.

6. The supported catalyst as claimed in claim 1, wherein the magnesium-aluminum composite oxide has a specific surface area of 150-230 $m^2/g$, a pore diameter of 8-18 nm, a pore volume of 0.2-0.6 mL/g, and a bulk density of 0.6-0.8 g/mL.

7. The supported catalyst as claimed in claim 1, wherein based on the total weight of the supported catalyst, the content of Ni is 5%-10%; the content of Cu is 2%-3.5%; the content of Mo is 0.3%-0.4%; the content of Ce in $CeO_2$ is 4%-5%; and the total supported amount of the active components is not less than 15%.

* * * * *